(12) United States Patent
Riddle et al.

(10) Patent No.: US 8,092,084 B2
(45) Date of Patent: Jan. 10, 2012

(54) SYSTEM AND METHOD FOR TEMPERATURE MEASUREMENT

(75) Inventors: Alfred Riddle, Milpitas, CA (US); Anthony Sproul, San Jose, CA (US)

(73) Assignee: Finesse Solutions, LLC, San Joe, CA (US)

( * ) Notice: Subject to any disclaimer, the term of this patent is extended or adjusted under 35 U.S.C. 154(b) by 685 days.

(21) Appl. No.: 12/220,816

(22) Filed: Jul. 28, 2008

(65) Prior Publication Data

US 2010/0020842 A1    Jan. 28, 2010

(51) Int. Cl.
*G01K 7/14* (2006.01)
*G01K 7/16* (2006.01)
*G01K 7/21* (2006.01)
*G01K 7/22* (2006.01)
*G01K 7/24* (2006.01)

(52) U.S. Cl. ........ 374/185; 374/171; 374/173; 327/513; 702/130

(58) Field of Classification Search .......... 374/170–173, 374/178, 163, 183, 185, 1, 100, 114; 702/130–136, 702/99; 327/512, 513
See application file for complete search history.

(56) References Cited

U.S. PATENT DOCUMENTS

| | | | | |
|---|---|---|---|---|
| 3,237,117 A | * | 2/1966 | Collings et al. | 330/9 |
| 3,544,849 A | * | 12/1970 | Speaker | 361/165 |
| 3,723,774 A | * | 3/1973 | Rogers | 361/101 |
| 3,765,244 A | * | 10/1973 | Brzezinski | 374/168 |
| 3,842,674 A | * | 10/1974 | Wilbur et al. | 374/172 |
| 4,201,088 A | * | 5/1980 | Trietley, Jr. | 374/114 |
| 4,215,336 A | * | 7/1980 | Smith | 340/870.17 |
| 4,418,339 A | * | 11/1983 | Spofford et al. | 340/595 |
| 4,506,199 A | * | 3/1985 | Asche | 388/816 |
| 4,536,851 A | * | 8/1985 | Germanton et al. | 702/131 |
| 4,633,885 A | * | 1/1987 | DuBrucq et al. | 600/549 |
| 4,659,236 A | * | 4/1987 | Hobbs | 374/208 |
| 5,277,495 A | * | 1/1994 | Forehand | 374/183 |
| 5,455,843 A | * | 10/1995 | Cherubini et al. | 375/230 |
| 5,795,069 A | * | 8/1998 | Mattes et al. | 374/183 |
| 6,851,849 B2 | * | 2/2005 | Kimura | 374/163 |
| 7,656,945 B1 | * | 2/2010 | Warner et al. | 375/233 |
| 7,775,711 B2 | * | 8/2010 | Wang | 374/183 |
| 7,857,510 B2 | * | 12/2010 | Liepold et al. | 374/178 |
| 2006/0203883 A1 | * | 9/2006 | Griffin | 374/178 |
| 2006/0250145 A1 | * | 11/2006 | Kobbe et al. | 324/691 |

\* cited by examiner

*Primary Examiner* — Gail Verbitsky
(74) *Attorney, Agent, or Firm* — Herbert Burkard

(57) ABSTRACT

A method for precision thermal measurement and control, especially for bioreactors, as well as the correction of temperature sensitive probes such as pH and dissolved oxygen. Typical control requirements are +/−0.1° C. The thermal measurement circuit converts a sensor output to a high level voltage or current with great accuracy and provides noise immunity and sensor isolation. While digital outputs from sensor converters can have the greatest noise immunity, the noise associated with digital circuitry may contaminate low level sensor signals so in many cases an analog sensor converter is preferred because of low noise generation, especially if the converter is near the sensor. The circuit is low cost, reliable, generates minimal heat is immune to, and does not generate noise, and requires minimal calibration effort.

3 Claims, 6 Drawing Sheets

SYSTEM AND METHOD FOR TEMPERATURE MEASUREMENT

FIELD OF THE INVENTION

Precision thermal measurements are needed in many instruments. In particular, operators of bioreactors need to provide accurate temperature measurement for control of the reaction as well as for the correction/accurate calibration of temperature sensitive probes such as those which are used to measure pH or dissolved oxygen. Typical temperature measurement requirements are +/−0.1° C. accuracy although somewhat less accuracy may sometimes be adequate for sensor compensation/calibration. A superior thermal measurement circuit would convert a temperature sensor output to a high voltage or current signal with high accuracy. Additionally the high level signal would preferably provide good noise immunity and sensor isolation. While digital outputs from sensor converters will frequently have good noise immunity, the noise associated with digital circuitry can contaminate low level sensor signals. An analog sensor signal converter is therefore preferred in many cases because of low noise generation, especially if the converter is situated near the sensor itself. It is also desirable for a temperature measurement circuit to be low cost, reliable, generate minimal heat (which could bias the sensor), be immune to and not generate noise, and require minimal calibration effort.

The present invention is designed to meet the above-indicated operational criteria and thus provides a significant advance in analog temperature sensor converters. Our invention converts thermistor resistance to voltage and takes advantage of recent advances in integrated circuit voltage reference accuracy and cost reduction, advances in thermistor accuracy, and also the availability of inexpensive high precision (0.1%) surface mount resistors

BACKGROUND OF THE INVENTION

The prior art describes a variety of methods for converting a temperature sensitive resistance to a voltage. Historically most methods are based on a bridge technique where a device with a known temperature versus resistance characteristic is balanced by a precision resistor, often implemented as a decade resistor box, which would be set by hand or servo to balance the bridge [see e.g. Sensor Technology Handbook, ed. J. S. Wilson, pp. 556-557, Temperature Measurement, Ed. B. G. Liptak, 1993, pp. 79, 92]. FIG. 1 shows an example of a Wheatstone bridge circuit using a decade resistor $R_d$ to balance the thermistor sensor resistance. In the case of FIG. 1, a zero voltage output from the amplifier $U_1$ indicates a balanced bridge. Reading the decade resistor provides the thermistor resistance and the temperature can thus be read from the thermistor temperature versus resistance curve. The two resistors $R_1$ and $R_d$ in the top of the bridge must be matched, but the absolute resistance value of $R_1$ and $R_d$ is not critical to the accuracy of the temperature measurement. $V_{REF}$, $R_2$ and $R_T$ denote a stable reference voltage, a fixed resistance and a thermistor, respectively. This circuit allows a high gain amplifier to be used without concern about amplifier nonlinearity, as only the zero voltage output is used. Driving the amplifier output to zero volts in conjunction with available resistors can sometimes provide sufficient accuracy, noise immunity, and independence from amplifier nonlinearity. However, this prior art approach entails a circuit that is bulky, complex, and slow as it requires the switching of a decade resistor box. Amplifier offset voltages and drift are still a concern, requiring a calibration routine to measure the amplifier offset and also requiring the use of stabilized amplifiers to reduce the drift.

Newer bridge techniques use stabilized amplifiers to provide zero drift and precision bridge resistors instead of a variable tuning resistor. FIG. 2 shows an example of such a circuit. In FIG. 2 $U_1$ denotes the amplifier, $R_1$, $R_2$, $R_3$, $R_T$ represent the balanced bridge resistors and $V_{ref}$ designates the reference voltage source. The amplifier has high linearity and amplifies the difference between the thermistor and the reference resistor rather than adjusting a resistor bridge. Even though many thermistors have a large resistance change with temperature, very high (over 40 dB) amplifier gains are required to achieve amplifier outputs on the order of even a few volts over a 0 to 50° C. range. Also, high gain amplifiers create greater sensitivity to amplifier offset and drift. The circuit shown in FIG. 2 also requires a known reference voltage as the absolute value of the output voltage is now of significance. Also, every bridge resistor must be of high precision. [see Sensor Technology Handbook, ed. J. S. Wilson, pp. 556-557, Temperature Measurement, Ed. B. G. Liptak, 1993, pp. 79, 92 and Transducer Interfacing Handbook, Ed. D. Sheingold, 1980, p. 149]. See also U.S. Pat. Nos. 5,537,049; 5,066,140; 4,648,270; 4,161,880; and 3,942,123.

For the prior art circuit shown in FIG. 3 a direct connection to an analog-to-digital converter (ADC), without an analog amplifier, can be used when wire resistance to the sensor is insignificant compared to the sensor resistance. Modern ADCs can be configured as shown in FIG. 3 so that the ADC can measure both the sensor and the reference voltage. [Sensor Technology Handbook, ed. J. S. Wilson, pg. 42]. This eliminates reference accuracy and drift issues but requires that resistors of known resistance, or at least precisely matched resistors, be used in the bridge. Also, mounting the ADC remote from the sensor increases the risk of noise ingress on the bridge voltage and creates an offset in the sensor reading due to the resistance of the wire to the thermistor If the measurement circuit is remote from the sensor then wire resistance will add to the sensor resistance unless some kind of compensation technique is implemented. Typically sensor wires are very thin to minimize thermal conductivity and heat loss, but this thinness increases electrical resistance in the connecting wires and can thus contribute to measurement errors. FIGS. 4A, 4B, and 4C show two-wire, three-wire, and four-wire connection methods, respectively [see Temperature Measurement, Ed. B. G. Liptak, 1993, pp. 79-81, Transducer Interfacing Handbook, Ed. D. Sheingold, 1980, p. 137, Sensor Technology Handbook, ed. J. S. Wilson, pp. 556-557]. When high resistance thermistors are used, such as those of 10 k ohms and above, this problem can be less significant or even negligible, ultimately depending on the accuracy required. In any case, several methods can be used to compensate for wire resistance. FIG. 4A shows a circuit where the wire resistance ($R_W$) to and from the sensor ($R_T$) adds to the total circuit resistance ($R_1$) and so creates an offset in the temperature conversion. FIG. 4B shows a three-wire technique to compensate for the wire resistance. In FIG. 4B the bridge switches to a loop with the lower two wires and a known resistance being used to calculate the loop resistance. Because all the wires are the same diameter and length, this allows the resistive offset to be computed so that the sensor resistance can be ascertained. In this case the single wire from the sensor ($R_T$) would attach to the bottom of the bridge and the other two wires to a common node would attach to the upper arm of the bridge and to the measurement circuit, respectively. The added resistance of each wire appears equally in the upper and lower bridge paths and so cancels. Because no current flows through the wire to the measurement circuit the three wire configuration can compensate for the sensor wire lengths. FIG. 4C shows a four-wire technique used to mitigate the added resistance of the wire length. In FIG. 4C current to the sensor is sent through the outer pair of wires, while the voltage across the sensor ($R_T$) is read from the inner pair of wires. Because essentially no current flows in the sensor wires the voltage reading across the thermistor indicates the true voltage drop.

Another aspect of prior art concerns the nonlinear resistance versus temperature curve of thermistors. FIG. 5 shows a curve for a typical, as used in the prior art, 10 k ohm thermistor. The thermistor resistance characteristic is described by the three Steinhart-Hart coefficients which are A, B, and C in Equation (1). However, as can be seen this curve is nonlinear which creates complications with both sensor circuit dynamic range and sensor calibration. If a temperature sensor is inherently linear or can be linearized, then a greater dynamic range over the entire operating temperature range can be realized, as is discussed in greater detail below.

$$\frac{1}{°K.} = A + B\ln(R) + C\ln(R)^3 \quad (1)$$

Equation (1) shows that a negative temperature coefficient of resistance (NTC) thermistor has an almost linear relationship between one over the temperature in degrees Kelvin (1/K) and the natural logarithm of the resistance, as is shown in FIG. 6.

BRIEF DESCRIPTION OF THE DRAWINGS

FIGS. 1 through 9 are illustrative of the prior art, while

FIG. 1 shows a Wheatstone bridge balancing a thermistor with a decade resistor box.

FIG. 2 shows a Wheatstone bridge using an ungrounded thermistor and amplifier to convert the thermistor resistance to a voltage.

FIG. 3 shows a Wheatstone bridge with an analog-to-digital converter to measure both the circuit output and the reference voltage.

FIGS. 4A, 4B and 4C show alternative circuit configurations for connecting the temperature measurement circuit to a remote resistive sensor ($R_T$). A) two-wire; B) three-wire; and C) four-wire.

FIG. 5 is a graph showing a resistance versus temperature (° C.) curve for a typical negative temperature coefficient thermistor.

FIG. 6 is a graph showing a resistance versus temperature curve for an NTC thermistor when plotted in 1/Kelvin and the resistance in ohms.

FIG. 7 shows a circuit in accordance with the prior art which produces a non-linear output voltage proportional to the thermistor resistance.

FIG. 8 shows another circuit in accordance with the prior art for linearizing the output voltage of a thermistor circuit.

FIG. 9 is a graph showing a comparison of output voltage results for the circuits of FIGS. 7 and 8 when $R_T$ is nominally 10 k ohms, $V_{REF}$ is 4.5 v, $I_{REF}$ is 0.1 mA, and $R_1$ is 7 k ohms In FIG. 9 the response of the circuit of FIG. 7 is the solid curve and the response of the circuit of FIG. 8 is the dashed curve.

FIG. 10 shows a circuit in accordance with a preferred embodiment of the present invention.

FIG. 11 shows components of a temperature measurement assembly in accordance with the present invention.

DETAILED DESCRIPTION OF THE INVENTION

Figure 11:
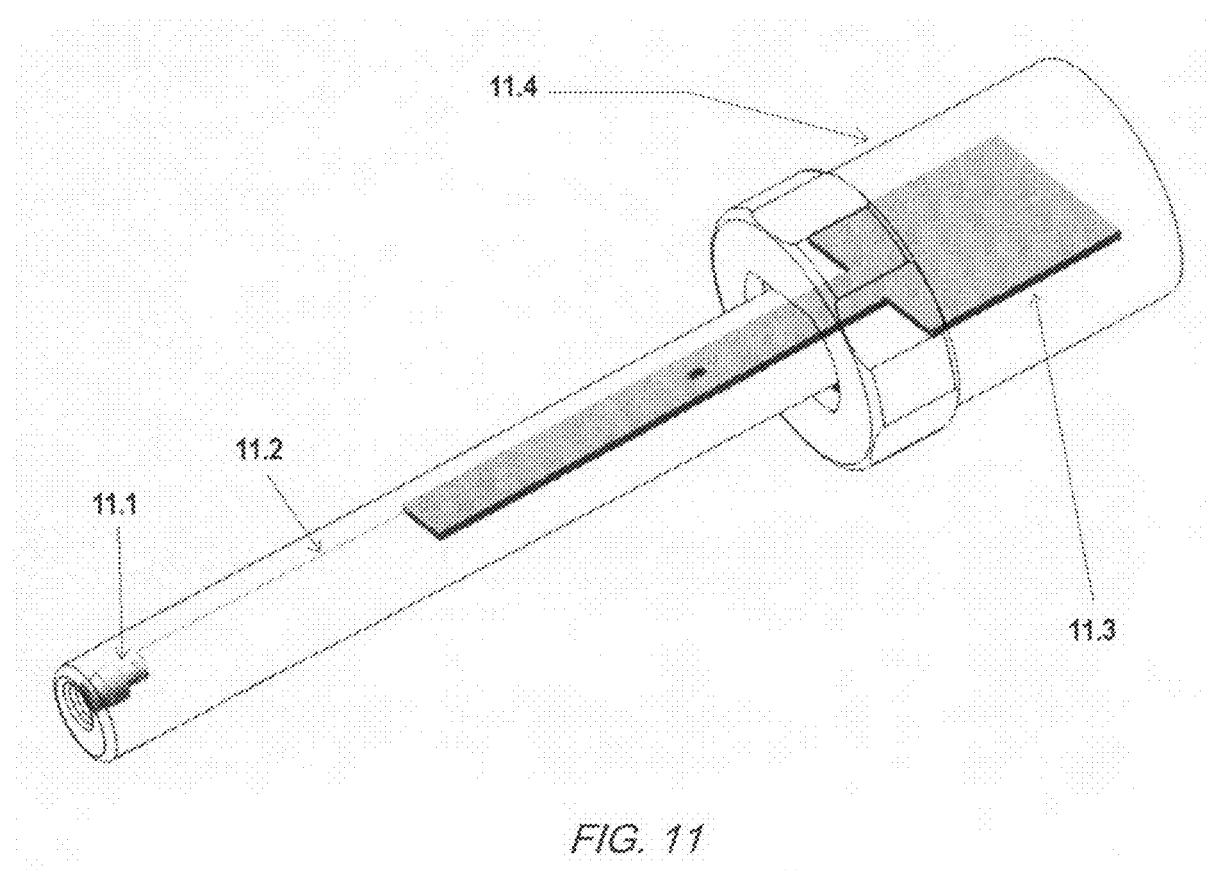

The analog circuits of the present invention are used for converting the response of a resistive temperature sensor to a voltage that is then converted to a temperature reading which can be read and/or recorded. A key advantage of the circuits of the present invention is temperature measurement accuracy. Circuits designed in accordance with the teaching of the present invention provide minimal noise generation and thermistor heating, low component count, and small size thereby allowing the temperature measuring circuit to be mounted in the sensor probe as shown in FIG. 11. The accuracy numbers set forth below were obtained for one embodiment of the circuit of the present invention using currently available components.

Figure 1:
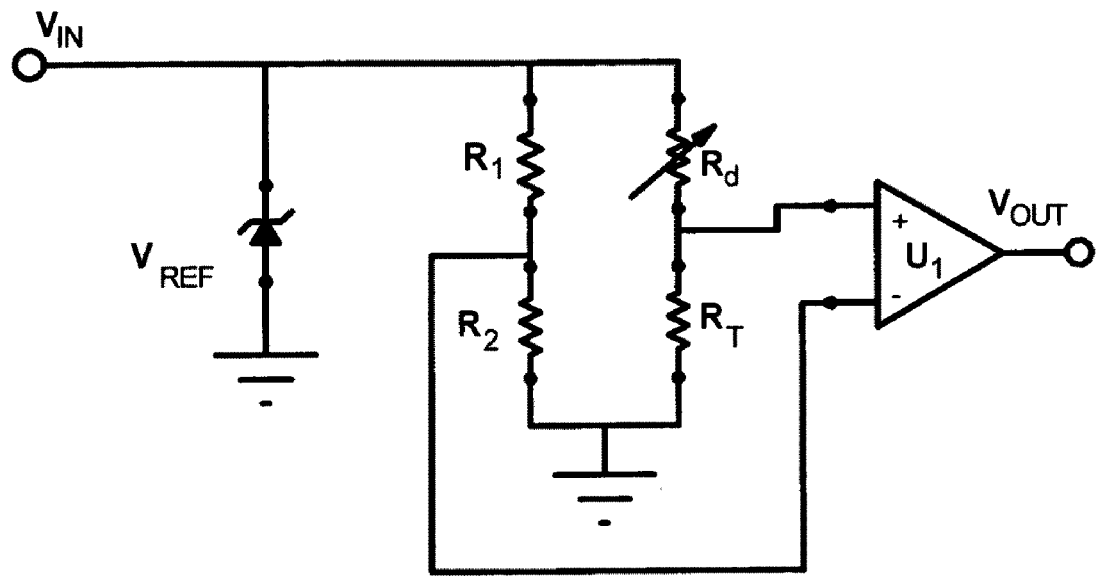
Figure 2:
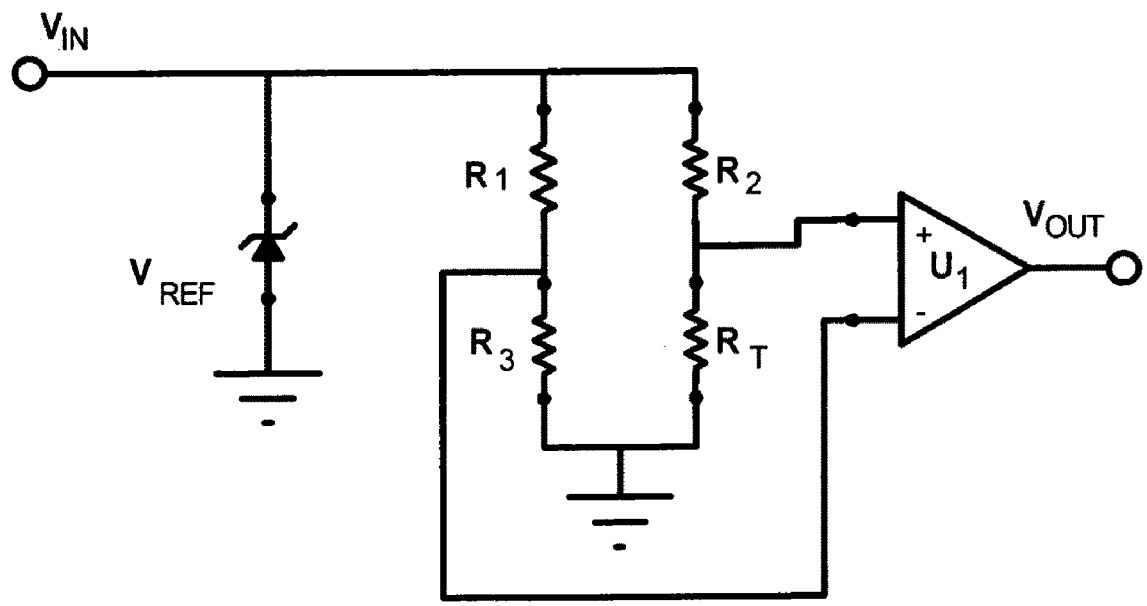
Figure 3:
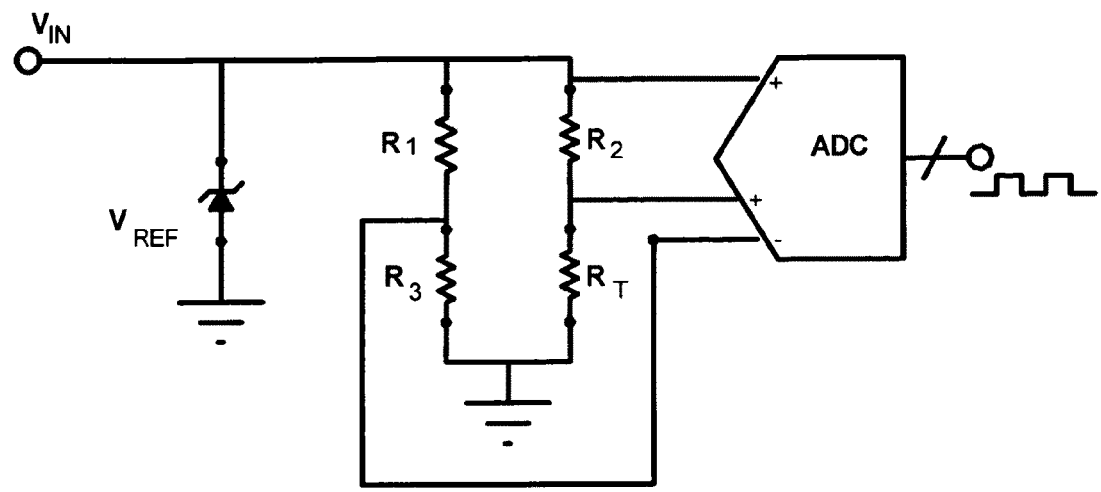
Figure 4:
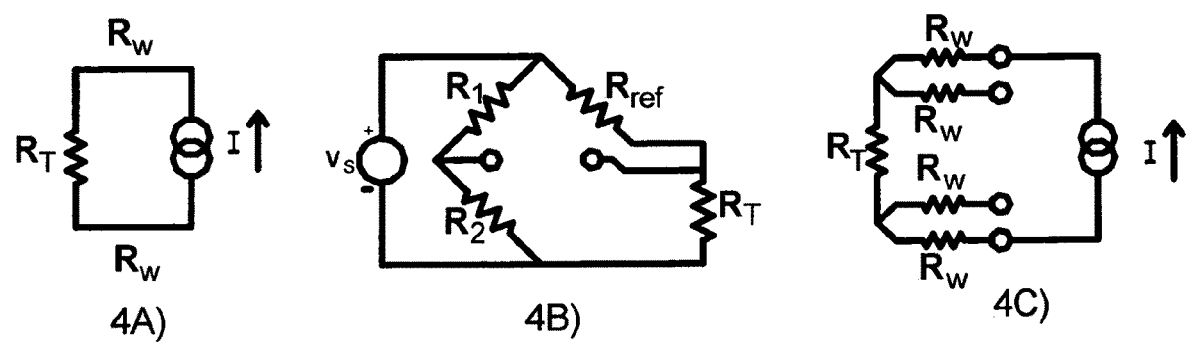
Figure 5:
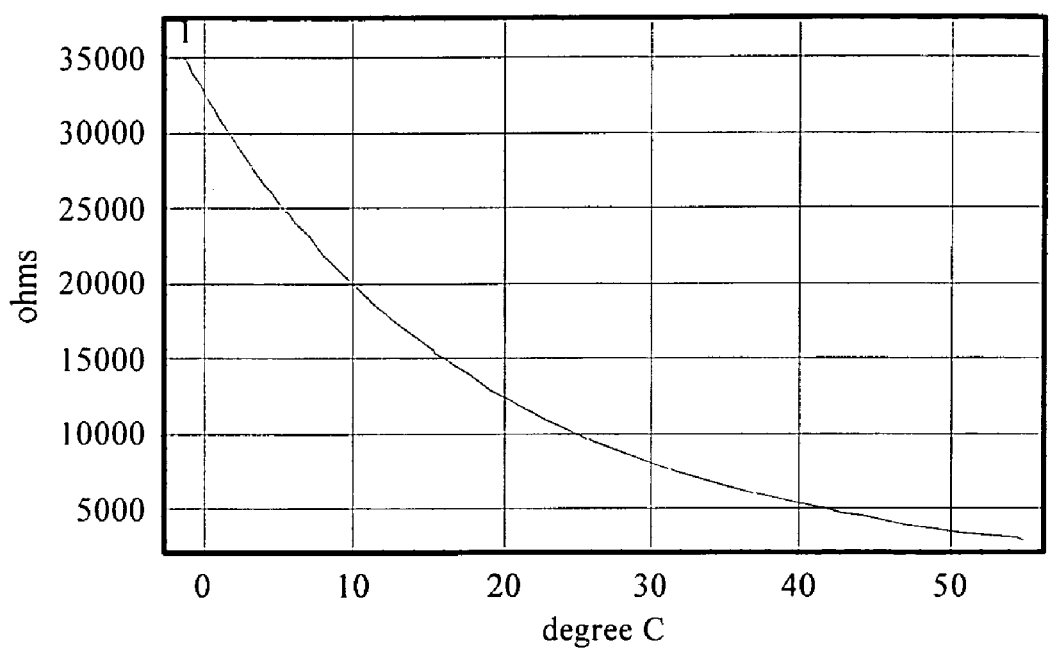
Figure 6:
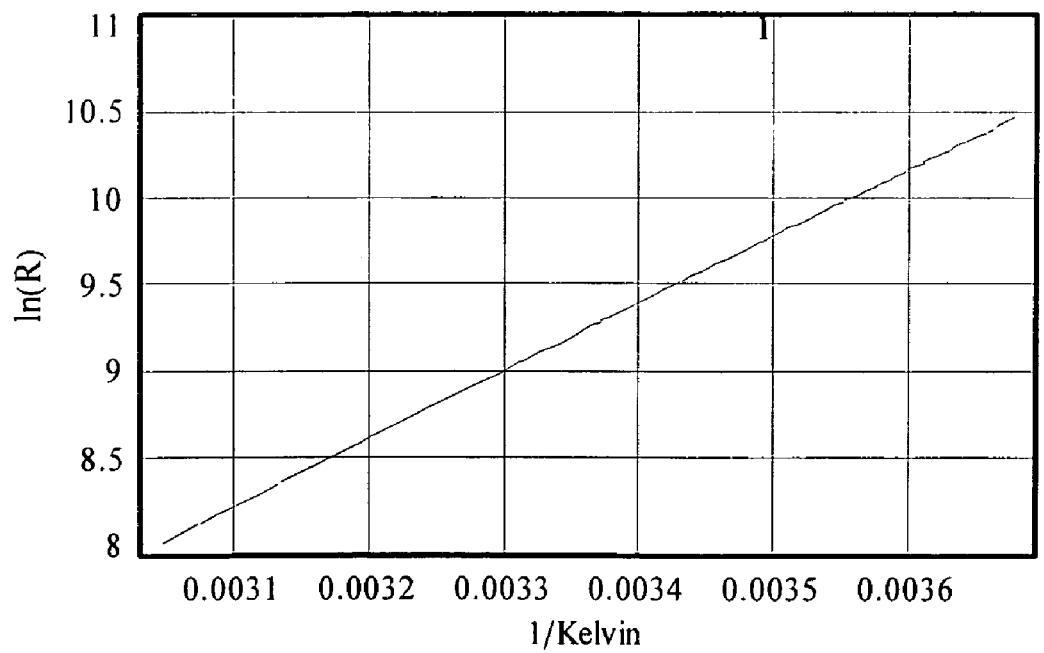
Figure 7:
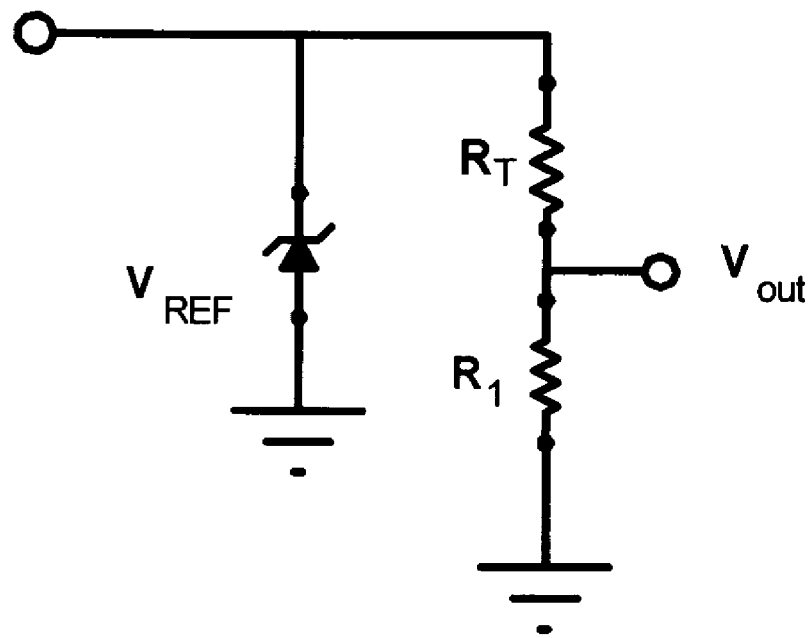
Figure 8:
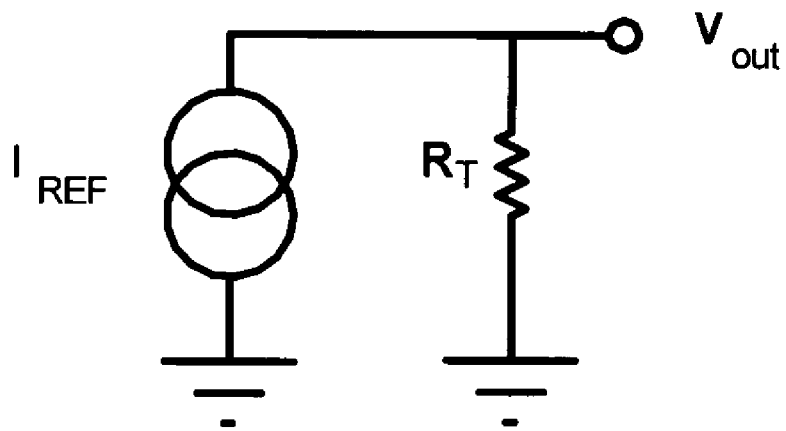
Figure 9:
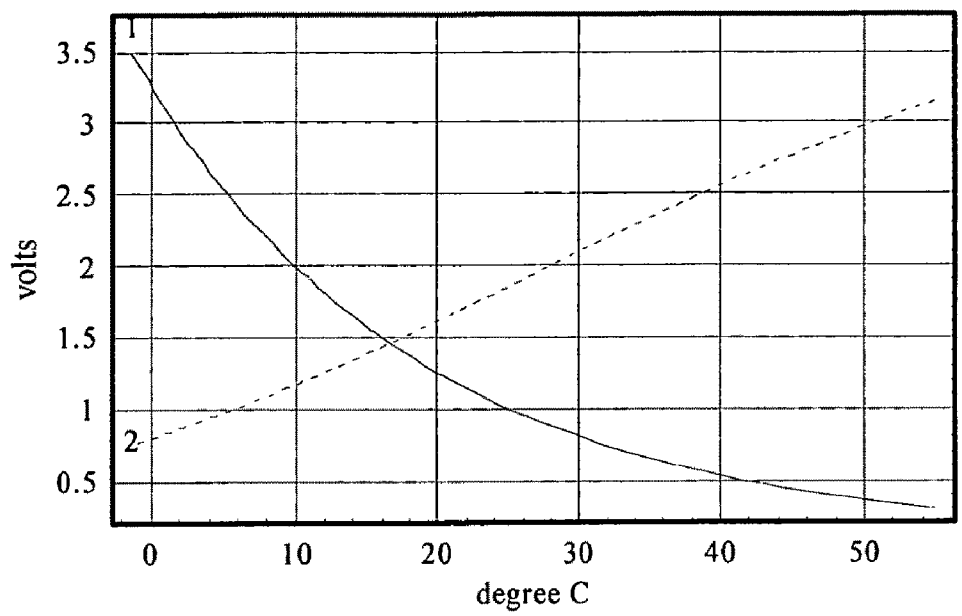

A temperature sensor (thermistor) has greater dynamic range over its entire temperature range if the sensor's response is linear. FIG. 7 shows a thermistor circuit in accordance with the prior art. In the circuit of FIG. 7 a proper choice of the linearizing resistor $R_1$, in relation to the resistance range of the thermistor ($R_T$) at 25° C., creates an approximately linear relationship between output voltage and temperature over a temperature range. The value chosen for $R_1$ depends on the thermistor resistance range, the desired temperature measurement range, and the desired mean temperature. An optimization method, such as one using a Levenberg-Mardquart algorithm, can provide the best fit given the above-indicated constraints. A variety of other optimization methods such as Simplex, Steepest Descent, or Simulated Annealing [see Optimization Theory with Applications, D. A. Pierre, 1986, pg. 193-295, pg. 296-308, Numerical Recipes in C, W. H. Press, et. al., 1988, pg. 343-352] are known in the art for choosing $R_1$ can suitably be employed for circuit optimization. FIG. 8 shows a circuit in accordance with the prior art driving a thermistor which produces a linearized output. FIG. 9 is a graph which shows a comparison between the circuit of FIG. 8 using a 10 k ohm thermistor with values (as in Equation 1) for A, B, and C of 0.00112689, 0.000234456, and 8.65251 $10^{-8}$, respectively, and also the circuit of FIG. 7 with an $R_1$ of 7 k ohms. As can be seen, the output voltage is generally proportional to the temperature in the circuit of FIG. 8 over this temperature measurement range. The dashed curve from the circuit of FIG. 8 shows a relatively constant sensitivity to temperature. The solid line curve for the circuit of FIG. 7 shows a less desirable non-linear response with varying sensitivity to temperature.

Figure 10:
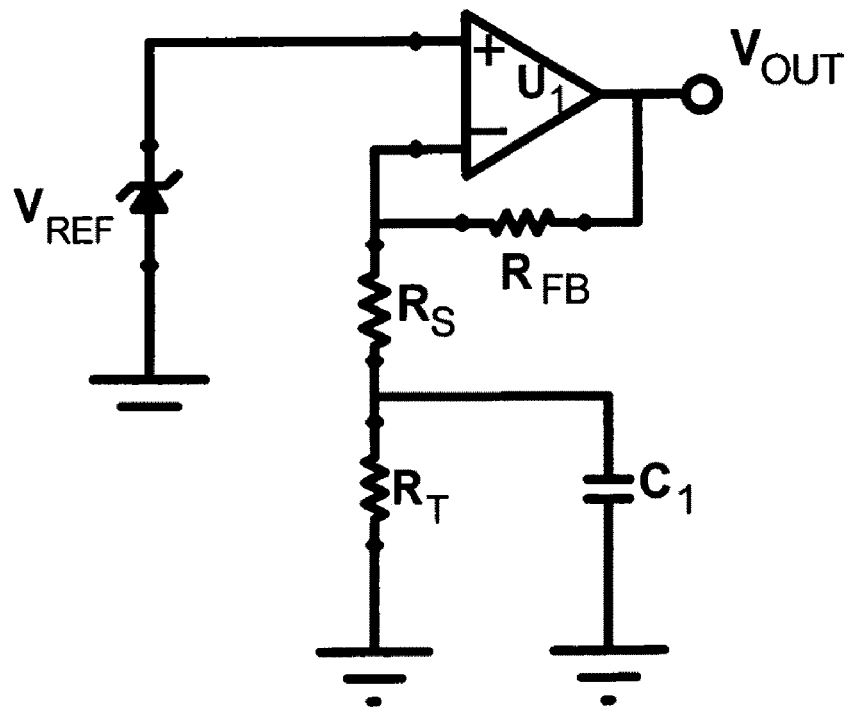
FIGS. 10 and 11 are illustrative of the present invention.

The present invention is particularly advantageous in that it requires the use of only a limited number, (i.e., four) accurate components. In FIG. 10 these components are shown as $V_{REF}$, $R_{FB}$, $U_1$ and $R_T$. $V_{REF}$ is the reference source voltage. $R_S$ represents a linearization resistor in series with the thermistor. However as discussed below, $R_S$ can have a value of zero and is therefore not a critical (although preferred) element of the circuit of the present invention. $R_{FB}$ is the amplifier feedback resistor. $U_1$ is an amplifier, preferably an operational amplifier (opamp). $R_T$ is the thermistor used as a temperature sensor. Inexpensive thermistors are available having accuracies of ±0.05° C. Surface mount type resistors are less expensive and available having ±0.1% accuracy. Inexpensive surface mount voltage references are now available with an accuracy of ±0.2% or better, as well as low drift over time and temperature. Operational amplifiers (opamps) are available with near zero drift and offset voltage. Chopper stabilized opamps are a particularly preferred embodiment of the present invention as shown in FIG. 10. The preferred circuit embodiment of FIG. 10 also includes a capacitor $C_1$. Using the above-indicated component accuracies as an example yields a temperature measurement circuit which is accurate to within ±0.3° C. If the circuit is calibrated as described below then an accuracy of ±0.06° C. can be achieved. If the thermistor has an even higher accuracy, or if the entire circuit is calibrated, the temperature measurement can be even more accurate.

In the circuit shown in FIG. 10, $R_S$ functions as a linearizing resistance for the thermistor characteristic in the same way that $R_1$ does in the prior art circuit of FIG. 7. Although $R_S$ can be zero and the circuit of the present invention will still be advantageous, a non-zero $R_S$ can serve as an enhancement in many ways. However, selecting $R_S$ and $R_{FB}$ is now slightly more complicated than in the circuit of FIG. 7 because now there are two variables ($R_S$ and $R_{FB}$) instead of just one variable ($R_1$) and one needs to consider the gain and finite output voltage limits of the opamp. In the circuit of FIG. 10 $R_{FB}$ should preferably be selected so that the opamp output voltage does not saturate due to the supply bias limit ($V_{supply}$) when $R_T$ has its smallest value. An optimization method, such as those discussed in paragraph [010], can be used to determine the optimum circuit values, but further constraints may be present. Design tradeoffs such as this are familiar to those skilled in the art. In the circuit of FIG. 10 the output voltage is limited to $V_{REF}$ when $R_T$ is infinite. In the circuit of FIG. 10 the output voltage is limited to $V_{supply}$ or $V_{REF} (R_S+R_{Tmin})/R_{Tmin}$, whichever is less, when $R_T$ is zero.

One aspect of maintaining circuit measurement accuracy is to limit thermistor self heating. This can be accomplished by limiting the voltage across $R_T$ such that $V_{REF}/R_{Tmin}<P_D$ where $P_D$ is the maximum power dissipation by the thermistor as specified by the thermistor manufacturer (typically $P_D<0.1$ mW). $V_{REF}$ sets the maximum $R_T$ voltage. In a preferred embodiment $V_{REF}$ is −1.2V which assures $P_D<0.1$ mW for a 10 k ohm thermistor used over the range of 0 to 50° C. The use of a non-zero resistance linearization resistor $R_S$ further reduces the voltage across $R_T$ and thus reduces the power dissipated.

The present invention is advantageous since it enables the use of low power circuitry with low current usage opamps and reference voltage sources which means it can be mounted close to the thermistor without contributing significantly to the heating of the thermistor. Mounting the circuit close to $R_T$ means that the added resistance due to lead wire length will be minimal, minimal noise ingress will occur because the signal is amplified to a high level before being transmitted any substantial distance. Likewise, minimal ingress of noise will occur in the shorter wire leads to the thermistor since noise ingress is generally proportional to lead length.

Although as above indicated, it is possible for $R_S$ to be zero in the practice of the present invention, a nonzero $R_S$ provides several advantages. A nonzero $R_S$ provides: linearization, self heating reduction, ESD protection for the opamp; and a convenient point for resistor-capacitor (RC) filtering. Opamps have sensitive input circuitry which should be protected from overvoltage. A nonzero resistance $R_S$ provides a current limiting resistance which makes the circuit more reliable and robust in use. For additional noise filtering in a preferred embodiment a capacitor $C_1$ can be inserted between the junction of $R_S$ and $R_T$ and ground as shown in FIG. 10 The existence of $R_S$ (especially a nonzero Rs) limits the opamp gain to any residual voltage induced on this filtering capacitor $C_1$.

Because the circuitry of the present invention can be implemented in very small IC packages, such as a SOT-23 amplifier, uses few components, and produces no switching noise, it can be mounted close to the temperature sensor while still maintaining a small volume for the combination of sensor and circuitry and achieving all the advantages previously mentioned regarding minimizing noise ingress and heat generation which might affect the sensor as shown in FIG. 11.

Failure detection is an inherent element of good industrial design. Any circuit design which has operating points which overlap failure points is both difficult to troubleshoot and also difficult to maintain. Referring to FIG. 10, the circuit of the present invention can fail at three known values: $V_{OUT}=0$ (indicating no current supply or no connection); $V_{out}=V_{REF}$ (indicating sensor open); or $V_{OUT}=V_{supply}$ (indicating sensor shorted or $R_S$ too low). These three conditions all fall outside the normal operating conditions of the circuit and thus provide the benefit of giving a clear fault indication.

For any temperature measurement device accuracy is, of course, important. The device may be designed accurate (i.e., use known accurate parts) and/or be calibrated accurate (utilize a known repeatable circuit). The circuit design of the present invention achieves three desirable goals: design accuracy; simple manufacturing calibration with known thermistor accuracy; and suitability for absolute calibration. As used herein absolute calibration refers to calibrating the entire circuit (the thermistor as well as the other electronic components by using known temperature standards) while manufacturing calibration refers to calibration of the circuit components other than the thermistor (which can be done with readily available certified known resistor standards). Calibration using temperature standards is an involved process, especially when accuracies better than ±1° C. are required [see Temperature Measurement, Ed. B. G. Liptak, 1993, pg. 6-19, 93].

Known accurate parts and circuit simplicity enable the present invention to provide a conveniently manufacturable and accurate temperature measurement circuit. Circuit accuracy depends on the tolerance of each component and how much that component contributes to the output response of the circuit. If components contribute equally to the output response then all of the components will preferably be equally accurate as the resulting overall system accuracy will be limited by the least accurate component. Greater complexity in a circuit means more components and greater cost because high precision components generally cost more than lower precision components. Calibration does not necessarily provide a means to use less expensive components because lower precision components frequently drift more over time and temperature than higher precision components. In a circuit according to the present invention the worst case accuracy using the above described components is ±0.3° C. at 25° C. with typically a slope of −0.0005° C. error per ° C. over a temperature range of 0 to 50° C. This performance, although satisfactory for most applications, can be still further improved by choosing voltage references and resistors which drift even less. However, the above-indicated drift is very small, and is negligible in effect over the quoted temperature range.

If the thermistor accuracy is assured, then circuit calibration can be readily accomplished using available resistors. Commercially available 0.01% tolerance resistance variation resistors have been found to be especially advantageous for use in the circuits of the present invention. A one point calibration can achieve a circuit accuracy of ±0.02° C. A one-point calibration for a 10 k ohm thermistor would consist of recording the circuit voltage output $V_{out}$ with a precision 10 k ohm resistor, mathematically predicting the output with nominal component values, and then using the ratio of the predicted output values to the recorded output to extrapolate all voltage outputs from the circuit.

If even greater accuracy is required a number of curve fit techniques can be performed to correct for the $V_{out}(R_i)$ where $R_i$ is a set of precision resistor values. These curve fits establish a relationship between the output voltage from the circuit and the input resistance with a known accuracy. To implement a curve fit typically a computer stores the output values at several known $R_i$, thereby creating a data set. A curve is fit through this data set using any of a number of known methods such as piecewise linear, splines, least squares and other known curve fitting methods [see Applied Numerical Methods, Carnahan, Luther & Wilkes, 1969, pgs. 571-585, Curve and Surface Fitting, Lancaster and Salkauskas, 1986, pgs. 29-126]. The accuracy of the fit will depend on the method chosen and methods for evaluating the accuracy are described in many numerical analysis texts [see Applied Numerical Methods, Carnahan, Luther & Wilkes pgs. 571-585, Curve and Surface Fitting, Lancaster and Salkauskas, 1986, pgs. 127-132]. Curve fitting methods represent a well known technique for calibration. In the case of the apparatus of the present invention one can implement a calibration technique which is potentially even more accurate than general curve fitting methods because it utilizes the characteristic transfer curve of the circuit instead of a curve defined by the general curve fitting methods already cited. Calibration using the transfer curve of the circuit described in connection with the present invention is set forth in the following paragraphs.

A very convenient calibration method is to consider that there are three dominant unknowns in the circuit of FIG. 10 (assuming a known thermistor accuracy). Given that $V_{REF}$, $R_S$, and $R_{FB}$ are unknown in the absolute sense, three precision resistors of known resistance can be substituted for $R_T$ and a perturbation analysis done on the circuit to thereby provide corrections to the values of $R_S$, $V_{REF}$, and $R_{FB}$. In this case perturbation analysis refers to the known techniques described in mathematical methods texts [for example, Advanced Engineering Mathematics, Wylie, 1975, pgs. 454-523 and 592-630, Nonlinear System Analysis, Blaquiere, 1966, pgs. 177-269, Matrix Methods and Applications, Groetsch and King, 1988, pgs. 282-296], the teaching of which is hereby incorporated by this reference. The essence of perturbation analysis is that nonlinear equations which cannot be solved analytically can be approximately solved if the initial values are close to the final values. The initial values can be 'perturbed' by small changes and the nonlinear equation will now be approximately linear with respect to these small changes, allowing an analytic solution to be found [see e.g., Nonlinear System Analysis, Blaquiere, 1966, pgs. 177-269] This simple and direct method of circuit calibration allows very accurate calibration (on the order of ±0.0005° C. if 0.001% resistors are used) because it uses the actual circuit response and not a curve fit. The technique also allows quick and low cost calibration because fixed resistors are used rather than expensive sensors and ovens or baths which take time to reach equilibrium [see Understanding the Uncertainties Associated with the Use of Metrology Wells, Hart Scientific, http://www.hartscientific.com/publications/pdfs/2510068.pdf].

Equation (2) defines the perturbation equation for the circuit of FIG. 10. As a practical matter the higher order terms can be ignored and Equation (2) can be written so that the $\delta_i$ terms can be separated out as shown in Equation (3). Given Equation (3), three known $R_i$ values, the corresponding $V_{out}$ values and nominal values for $V_{REF}$, $R_S$, and $R_{FB}$ then a matrix can be created, inverted and solved for the perturbations ($\delta_i$) to the nominal circuit values. Potential uncertainty in the circuit is thus reduced to ±0.0005° C.

$$V_{out} = V_S(1+\delta_1)\frac{R_{FB}(1+\delta_3) + R_T + R_S(1+\delta_2)}{R_T + R_S(1+\delta_2)} \quad \text{Eq. (2)}$$

$$V_{out}(R_T + R_S) - V_S(R_{FB} + R_T + R_S) = \quad \text{Eq. (3)}$$
$$V_S(R_{FB} + R_T + R_S)\delta_1 + (V_S - V_{out})R_S\delta_2 + V_S R_{FB}\delta_3$$

Once the circuit component values are known, a similar procedure can be used to solve the Steinhart-Hart coefficients for the thermistor if calibration beyond the thermistor accuracy indicated by the thermistor supplier is needed. This involves having manufacturer's temperature/resistance standards at three different temperatures available [see Temperature Measurement, Ed. B. G. Liptak, 1993, pg. 6-19, 93]. A perturbation analysis of Equation (1) can be used to set up a 3×3 matrix in which the three known temperature reference values can be used to correct the three nominal Steinhart-Hart coefficients. Given the limitations in temperature reference accuracy (which is higher than the uncertainty previously described, this method will approach the temperature reference accuracy within traceability limits [see Temperature Measurement, Ed. B. G. Liptak, 1993, pg. 6-19].

All components will have some drift with temperature. If the circuit is mounted in the sensor head then the circuit temperature will vary with the sensor temperature. Drift in the component values due to temperature change will be a further source of error. For the components shown in FIG. 10 maximum drift over the 0 to 50° C. range was 50 ppm/° C. for the reference voltage diode and approximately one-half that for the resistors. Typical measured drifts are in fact much less. Methods for correcting this can be achieved by mounting a low power IC (integrated circuit) sensor next to the reference voltage diode and correcting with a microprocessor (because this local sensor does not have to be very accurate as errors below 2° C. in the circuit temperature will cause essentially negligible error from drift computation compared to practical sensor calibration limits). Also, it can be assumed that the circuit temperature is close enough to the sensor temperature to use the measured temperature and self correct the result. These suggestions do not pose limitations on the final circuit performance, but simplified ways of practically achieving a highly accurate sensor with minimal parts, cost, and calibration effort.

FIG. 11 shows the components of an assembly in accordance with the present invention. The components shown are 11.1, thermistor (sensor) head, 11.2 wire interface, 11.3 sensor's circuitry, and 11.4 circuitry head containing the sensor's circuitry.

What is claimed is:
1. An analog temperature measurement circuit comprising:
 i. a thermistor,
 ii. a filtering capacitor in shunt with said thermistor,
 iii. a linearizing resistor Rs in series with said thermistor, said linearizing resistor having a non-zero resistance which resistance is selected using a numerical optimization method,
 iv. a reference voltage source which sets the maximum $R_T$ voltage across said thermistor
 v. a chopper stabilized operational amplifier in series with said reference voltage source, and in parallel with
 vi. a feedback resistor.
2. The circuit of claim 1 wherein the resistance of linearizing resistor Rs is selected to minimize self heating of the thermistor whose minimum resistance is $R_{Tmin}$ by limiting the voltage (V) across the thermistor such that $V/R_{Tn}$ is less than the maximum power dissipation of the thermistor.

3. A method of calibrating the circuit of claim 1 to correct measured deviations in the resistance of linearizing resistor Rs from its nominal value utilizing perturbation analysis in conjunction with resistors of known accuracy and the thermistor in said circuit is calibrated using a Steinhart-Hart curve fitting method using a three point calibration to correct determined errors in the Steinhart-Hart coefficients.

* * * * *